United States Patent [19]

Flores Agell

[11] Patent Number: 4,615,414

[45] Date of Patent: Oct. 7, 1986

[54] AUTOMATIC LUBRICATING DEVICE FOR MACHINE SHAFTS

[76] Inventor: José L. Flores Agell, Gran Via de les Corts Catalanes, 855, Barcelona, Spain

[21] Appl. No.: 728,889

[22] Filed: Apr. 30, 1985

[30] Foreign Application Priority Data

May 4, 1984 [ES] Spain .................. 279.441[U]

[51] Int. Cl.⁴ ............................................. F01M 9/06
[52] U.S. Cl. ................................................. 184/13.1
[58] Field of Search .................. 184/11.1, 11.2, 11.3, 184/13.1

[56] References Cited

U.S. PATENT DOCUMENTS 1,755,841 4/1930 Sandstrom .................. 184/13.1
2,242,195 5/1941 Teker et al. .................. 184/11.1

FOREIGN PATENT DOCUMENTS 111765 8/1964 Czechoslovakia .................. 184/11.1

Primary Examiner—Leonard E. Smith
Attorney, Agent, or Firm—Birch, Stewart, Kolasch & Birch

[57] ABSTRACT

A lubricating device for machine shafts applicable to mechanisms having a solid shaft with a central portion of less diameter than two flanking portions. The flanking portions are threaded in precisely opposite directions for transferring lubricating fluid to bearings supporting the solid shaft and a hollow shaft, the hollow shaft being externally and coaxially disposed with respect to the solid shaft. The hollow shaft has a plurality of holes for allowing the circulation of lubricating fluid. The device includes an obturator-slinger component for restricting and changing the direction of oil flow and for slinging lubricating fluid from a chamber located adjacent a bearing supporting the solid shaft.

5 Claims, 5 Drawing Figures

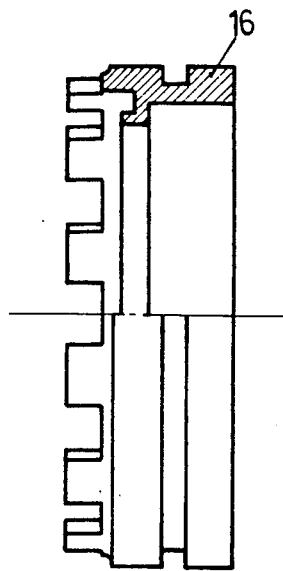
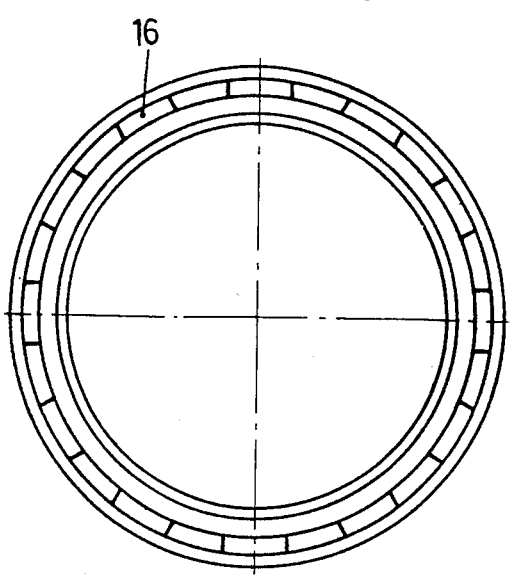
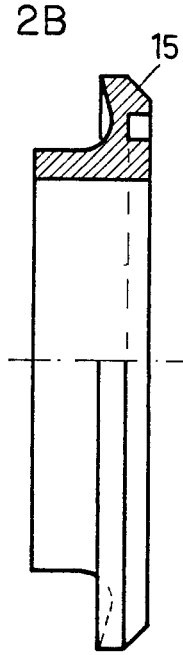
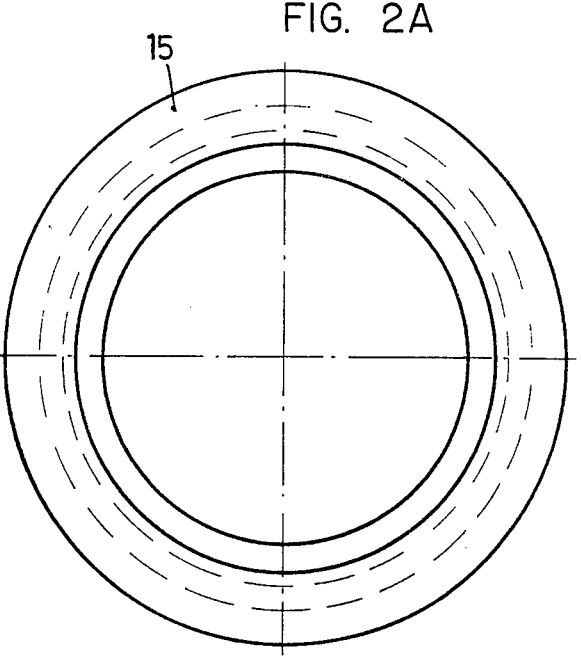

AUTOMATIC LUBRICATING DEVICE FOR MACHINE SHAFTS

BACKGROUND OF THE INVENTION

1. Field of the Invention

The present invention relates to a device intended to automatically ensure the lubrication of machine shafts, especially of machines belonging to heavy service equipment and facilities.

2. Description of Background Art

The use of the device concerned permits lubrication pumps and other invention used to such end to be done without, affording additional advantages which make its installation highly appropriate on the shafts of machines subject to tough working conditions because of their functional features, and especially with respect to working temperatures, operating rates and materials involved.

A typical but not exclusive application of the automatic lubrication device which is the object of this invention is in cement plant kilns which, as known, should turn at low speed, to which end a high-power reducing gear is used, which is calculated to ensure the operation of the rotary kiln, together with a second reducing gear, commonly called a slew gear, which functions as an auxiliary gear and is mechanically connected to the high-power reducing gear. When the slew gear is driven by a motor, a large reduction takes place for driving the kiln at very low speed, as at the start of operation of the facility.

When the main reducing gear is driven by the motor, a reduction is produced at its output shaft and the kiln is driven at the rated speed. To prevent multiplication in the auxiliary reducing gear, it should be mechanically disconnected, which is usually carried out by means of a device comprising a solid shaft, a hollow shaft and a freewheel, with a motor-driven pump for lubrication of the device since, in this phase, there is no internal oil bubbling since the slew or auxiliary reducing gear is idle.

The use of the motor-driven lubrication pump poses formal and functional problems which are difficult to solve, entailing, on the one hand, a need for continuous and costly maintenance, and on the other, the risk of interruptions in lubrication, with the consequences that this entails.

SUMMARY OF THE INVENTION

Accordingly, it is a primary object of the present invention to provide an automatic lubrication device for machine shafts which obviates the need to use motor-driven pumps for lubrication of a device comprising a hollow shaft, a solid shaft and a free wheel, with the resulting mechanical simplification of the assembly and the addition of formal and functional advantages which considerably increase the security of the facility and reduce its maintenance needs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B show a fragmentary sectional view and an elevational view, respectively, lubricant obturating and slinging component.

FIGS. 3A and 3B show a fragmentary sectional view and an elevational view, respectively, of a ring which ensures the leak-tightness of the mechanism and supplements the guiding of lubricant flow.

DETAILED DESCRIPTION OF PREFERRED EMBODIMENT

Figure 1:
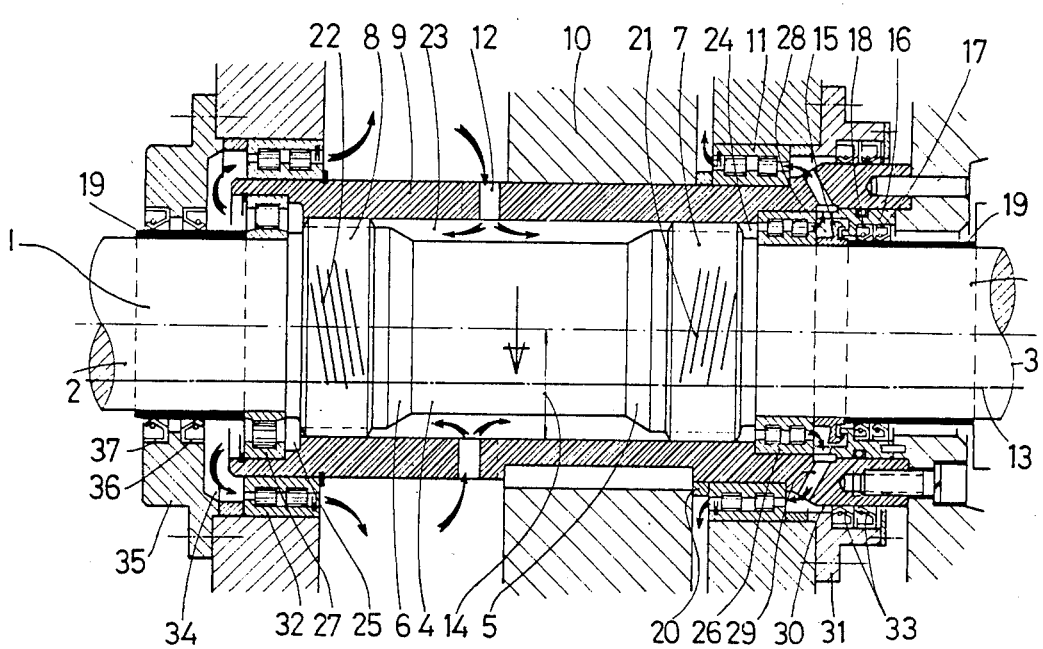
FIG. 1 is a sectional view of the assembly comprising the hollow shaft, the solid shaft and the mechanisms connected with both, as well as part of the freewheel mechanism which forms a part of the assembly.

Referring to FIG. 1, an axial shaft—1—is coupled at its end—2—to a main reducing gear (not shown) which is connected, on the one hand, to a rotary (not shown) which is to be driven (in this example, a cement plant kiln), and on the other hand, to a motor-driven device of higher power for operation of the kiln at the rated speed.

The end—3—of the shaft is coupled to a mechanism (not shown) which forms a part of an anti-return device of freewheel type, with a coupling system which is not shown here.

Zone—4—of shaft—1—, of smaller diameter, flanked by zones —5—and —6—of increasing diameter, defines a part whose function will be stated later on, and the cylindrical zones—7—and—8—form a part of the features of the invention.

The hollow shaft—9—, encasing and coaxial with shaft 1, has wheel—10—mounted on it, said wheel being connected to other mechanical components of an auxiliary reducing gear or slew, not shown. Shaft—9—is mounted on the bearings—11—, and has a number of radial holes—12—.

The assembly is housed inside a box-casing or housing, filled with a quantity of lubricating oil whose level —13—is approximately equal to the lower one half radius—14—of the inner diameter of hollow shaft 9. The outlet of the fluid is through the openings —12— —and it bathes the components which connect the two shafts, essentially obturator-slinger—15—and ring component 16 which holds the seals—17—and —18—.

The bushings—19—, integral with the shaft—1—, have the function of preventing wear of the shaft due to the effect of the seals, which unavoidably rub against it and they are easy to remove from shaft 1 by applying heat.

One feature of this invention is the existence, in each of the cylindrical zones—7—and—8—, of the threaded parts —21—and—22—, with appropriate threads in direction and length. These threads run precisely in opposite direction with respect to each other and are oriented in such a way that, according to the usual turning direction of the shaft —1—, they produce an axial thrust effect on the lubricating oil similar to the effect produced by the coils of a screw pump.

The lubricating oil which reaches the level—13—passes through holes —12—to space—23—defined by the central part—4—of smaller diameter of the shaft —1, and hollow shaft 9. As indicated by the arrows in FIG. 1, the oil flows toward zones—24—and—25—, which form pressure chambers in the shape of circular crowns. The oil then flows through the bearings—2-6—and—27—toward the space—28—defined by the components—15—and 16.

The—abturator—component—15—, whose complete shape may be seen in FIG. 2A and 2B, defines an intake part of rounded angular shape, which determines shaping of the ring chamber —28—, so that when the lubricating oil penetrates it under pressure after passing through the bearing—26—, it collides with obturator-slinger component 15 and changes direction, after which the flow of lubricant is directed towards openings—29—, which are radially and obliquely formed in the hollow shaft 9 and then flows outside the shaft.

The ring component 16, as shown in FIGS. 3A and 3B, has a number of notches. The notches define openings through which lubricating oil passes when the ring component 16 is mounted. Oil, after encounting obturator-slinger component 15, passes through these openings to corresponding radially and obliquely formed openings 29 in hollow shaft 9.

The lubricating oil, now occupies space—30—defined beween hollow shaft 9, support—31—, the bearings —11 and seals 33, and the seals—33—in the right hand part of FIG. 1. Likewise, oil occupies space—3-4—defined in the left hand part of FIG. 1 by support—35—and bearing 32 which flows outside the housing of the machine according to the descending arrows in the lower part of FIG. 1.

The separating ring—20—defines a space which ensures the return of the oil to the inside of the housing. The seals—36—and—37—in the lefthand part supplement the leak-tightness of the oil chamber, withstanding the pressure determined by the thrust effect of the threaded parts —21—and—22—.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An automatic lubricating device for machine shafts comprising:

a solid shaft with a central portion of smaller diameter, flanked by two zones of progressively increasing diameter;

a hollow shaft having an internal diameter, said hollow shaft being externally and coaxially disposed with respect to said solid shaft;

said two zones of progressively increasing diameter of said solid shaft flanked by separate cylindrical zones having separate threaded lengths with threads directed precisely in opposite directions;

said cylindrical zones are of a diameter equivalent to the internal diameter of said hollow shaft, said hollow shaft having a plurality of radial holes, which connect the outside of said hollow shaft with a space defined between said hollow shaft and said solid shaft, said radial holes located adjacent to the central portion of smaller diameter of said solid shaft for circulation of a lubricating oil flow.

2. An automatic lubricating device for machine shafts according to claim 1, and further including:

bearings supporting both said solid and hollow shafts;

an obturator-slinger component for restricting and changing the direction of oil flow and for slinging oil from a chamber defined by the shape of said obturator-slinger component located adjacent a solid shaft bearing which is positioned flanking a cylindrical zone, said hollow shaft including a plurality of symmetrically spaced radially and obliquely shaped openings for the passage of lubricating oil from the chamber defined by said obturator-slinger component to a space outside said hollow shaft located adjacent to the respective bearing supporting said hollow shaft.

3. The automatic lubricating device for machine shafts according to claim 2, in which said obturator-slinger component has an indentation of a rounded angular shape for guiding the flow of lubricating oil, which reaches said obturator-slinger component from an adjacent mechanical component, to the radially and obliquely shaped openings in said hollow shaft.

4. The automatic lubricating device for machine shafts according to claim 2, and further including a ring component having a plurality of notches which define openings through which lubricating oil passes, when the ring component is mounted, the openings formed after the ring component is mounted correspond to the radially and obliquely shaped openings in said hollow shaft, said ring component includes means for holding seals for said solid shaft, said obturator-slinger component and said ring component define a labyrinthic circuit for restraining oil flow.

5. The automatic lubricating device for machine shafts according to claim 3, including a ring component having a plurality of notches which define openings through which lubricating oil passes, when the ring component is mounted, the openings formed after the ring component is mounted correspond to the radially and obliquely shaped openings in said hollow shaft, said ring component includes means for holding seals for said solid shaft, said obturator-slinger component and said ring component define a labyrinthic circuit for restraining oil flow.

* * * * *